United States Patent
Ding et al.

(10) Patent No.: US 11,429,197 B2
(45) Date of Patent: Aug. 30, 2022

(54) LATIN CHARACTER CONVERSION APPARATUS, LATIN CHARACTER CONVERSION METHOD, AND NON-TRANSITORY COMPUTER-READABLE RECORDING MEDIUM ENCODED WITH LATIN CHARACTER CONVERSION PROGRAM

(71) Applicant: NATIONAL INSTITUTE OF INFORMATION AND COMMUNICATIONS TECHNOLOGY, Koganei (JP)

(72) Inventors: Chenchen Ding, Koganei (JP); Masao Uchiyama, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 17/430,202

(22) PCT Filed: Feb. 4, 2020

(86) PCT No.: PCT/JP2020/004187
§ 371 (c)(1),
(2) Date: Aug. 11, 2021

(87) PCT Pub. No.: WO2020/175040
PCT Pub. Date: Sep. 3, 2020

(65) Prior Publication Data
US 2022/0164037 A1    May 26, 2022

(30) Foreign Application Priority Data
Feb. 27, 2019 (JP) .............................. JP2019-034381

(51) Int. Cl.
*G06F 3/023* (2006.01)
*G06F 40/126* (2020.01)

(52) U.S. Cl.
CPC ............ *G06F 3/023* (2013.01); *G06F 40/126* (2020.01)

(58) Field of Classification Search
CPC .............................. G06F 3/023; G06F 40/126
See application file for complete search history.

(56) References Cited

U.S. PATENT DOCUMENTS 5,631,643 A * 5/1997 Hisamori ............... H03M 11/14
                                                   341/23
5,973,675 A * 10/1999 Joto ........................ G06F 3/023
                                                   341/26

(Continued)

FOREIGN PATENT DOCUMENTS

JP        4-286067 A      10/1992
JP        4-295914 A      10/1992

(Continued)

OTHER PUBLICATIONS

International Search Report dated Mar. 31, 2020, issued in counterpart International Application No. PCT/JP2020/004187. (2 pages).

*Primary Examiner* — Amit Chatly
(74) *Attorney, Agent, or Firm* — WHDA, LLP

(57) ABSTRACT

A Latin character conversion apparatus includes a code associator that associates each of a plurality of character keys assigned with Latin characters among a plurality of keys included in a keyboard with any of a plurality of character codes established by a character encoding scheme of the Unicode Standard, a character associator that associates the character code with a relevant code being another character code, a code converter that, in response to an instruction by a user that instructs any of the plurality of character keys, determines the character code associated (Continued)

with the instructed character key as a conversion candidate, and a character converter that, in response to an instruction by the user that instructs the character key serving also as a conversion key of the plurality of character keys with the conversion candidate determined, converts the conversion candidate into the relevant code associated with the conversion candidate.

12 Claims, 13 Drawing Sheets

(56) References Cited

U.S. PATENT DOCUMENTS

| | | | | |
|---|---|---|---|---|
| 2003/0189501 | A1* | 10/2003 | Chen | G06F 3/0219 345/168 |
| 2003/0190181 | A1 | 10/2003 | Kim | |
| 2005/0102432 | A1* | 5/2005 | Winslow | G06F 3/023 341/26 |
| 2006/0139315 | A1 | 6/2006 | Kim | |
| 2007/0092326 | A1 | 4/2007 | Kim | |
| 2007/0106492 | A1 | 5/2007 | Kim | |
| 2007/0110222 | A1* | 5/2007 | Kim | G06F 3/0237 379/355.07 |
| 2009/0153372 | A1* | 6/2009 | Wu | G06F 3/023 341/22 |
| 2010/0057439 | A1* | 3/2010 | Ideuchi | G06F 40/42 704/7 |
| 2010/0064077 | A1* | 3/2010 | Chung | G06F 3/023 710/67 |
| 2013/0179822 | A1* | 7/2013 | Park | G06F 3/01 715/774 |
| 2018/0232610 | A1* | 8/2018 | Kondo | G06K 15/1807 |

FOREIGN PATENT DOCUMENTS

| | | |
|---|---|---|
| JP | 2666590 B2 | 10/1997 |
| JP | 3088476 B2 | 9/2000 |
| JP | 2002-297291 A | 10/2002 |
| JP | 2006-518128 A | 8/2006 |

* cited by examiner

FIG. 3

CODE ASSOCIATION TABLE

| CHARACTER KEY | CHARACTER CODE |
|---|---|
| b | 1017 |
| c | 1005 |
| d | 1012 |
| e | 1031 |
| f | 103A |
| g | 1002 |
| h | 103E |
| i | 102D |
| j | 1038 |
| k | 1000 |
| l | 101C |
| m | 1019 |
| n | 1014 |
| p | 1015 |
| r | 103C |
| s | 101E |
| t | 1010 |
| u | 102F |
| v | 102C |
| w | 103D |
| y | 103B |
| z | 1007 |
| a | 1031, 102C |
| o | 102D, 102F |
| x | 1004, 103A |
| q | NONE |

FIG. 4
CHARACTER ASSOCIATION TABLE

| CONVERSION KEY | CHARACTER CODE | RELEVANT CODE |
|---|---|---|
| e | 1031 | 1032 |
| e | 1032 | 1031 |
| f | 1039 | 103A |
| f | 103A | 1039 |
| g | 1004 | 100F |
| g | 1014 | 1004 |
| g | 101C | 1020 |
| g | 1031 | 1027 |
| g | 100A | 1009 |
| g | 100F | 104C |
| g | 1010 | 100B |
| g | 1011 | 100C |
| g | 1012 | 100D |
| g | 1013 | 100E |
| g | 1019 | 1036 |
| g | 101B | 104D |
| g | 101E | 103F |
| g | 1020 | 104E |
| g | 1027 | 104F |
| g | 1029 | 102A |
| g | 102C | 102B |
| g | 102D | 1023 |
| g | 102E | 1024 |
| g | 102F | 1025 |
| g | 1030 | 1026 |
| h | 1000 | 1001 |
| h | 1010 | 1011 |
| h | 1012 | 1013 |
| h | 1002 | 1003 |
| h | 1005 | 1006 |
| h | 1007 | 1008 |
| h | 1015 | 1016 |
| h | 1017 | 1018 |
| h | 103E | 101F |

| CONVERSION KEY | CHARACTER CODE | RELEVANT CODE |
|---|---|---|
| i | 102D | 102E |
| i | 102E | 102D |
| j | 1037 | 1038 |
| j | 1038 | 1037 |
| r | 101E | 1029 |
| r | 103C | 101B |
| u | 102F | 1030 |
| u | 1030 | 102F |
| v | 102B | 1021 |
| v | 102C | 1021 |
| v | 1001 | 102B |
| v | 1002 | 102B |
| v | 1004 | 102B |
| v | 1012 | 102B |
| v | 1015 | 102B |
| v | 101D | 102B |
| w | 103D | 101D |
| y | 1014 | 100A |
| y | 103B | 101A |
| a | 1001 | 1031+102B |
| a | 1002 | 1031+102B |
| a | 1004 | 1031+102B |
| a | 1012 | 1031+102B |
| a | 1015 | 1031+102B |
| a | 101D | 1031+102B |

FIG. 9

| ORDER | LATIN CHARACTER | BUFFER | DISPLAY |
|---|---|---|---|
| 1 | k | 1000 | က |
| 2 | n | 1000, 1014 | ကန် |
| 3 | g | 1000, 1004 | ကc |
| 4 | g | 1000, 100F | ကဈ |
| 5 | f | 1000, 100F, 103A | ကဈ် |
| 6 | f | 1000, 100F, 1039 | ကဈ္ |
| 7 | t | 1000, 100F, 1039, 1010 | ကဈ္တ |
| 8 | h | 1000, 100F, 1039, 1011 | ကဈ္ထ |
| 9 | g | 1000, 100F, 1039, 100C | ကဈ္ဌ |

FIG. 10

| q | w | e | r | t | y | u | i | o | p |
|---|---|---|---|---|---|---|---|---|---|
| 0.2 | 2.3 | 4.3 | 6.8 | 3.6 | 5.0 | 3.7 | 3.5 | 2.5 | 3.4 |
| a | s | d | f | g | h | j | k | l | |
| 2.1 | 2.9 | 0.5 | 8.4 | 2.9 | 7.2 | 9.9 | 6.0 | 1.7 | |
| z | x | c | v | b | n | m | | | |
| 0.1 | 3.0 | 3.1 | 7.8 | 0.5 | 4.8 | 3.8 | | | |
| 2.4 | 8.2 | 7.9 | 23.0 | 7.0 | 17.0 | 17.4 | 9.5 | 4.2 | 3.4 |

35.3 | 41.6 | 23.1

KEYSTROKE FREQUENCY (%)

F I G. 11

| q | w | e | r | t | y | u | i | o | p |
|---|---|---|---|---|---|---|---|---|---|
| 0.1 | 2.4 | 4.9 | 5.5 | 4.3 | 5.2 | 3.4 | 4.1 | 3.1 | 3.2 |
| a | s | d | f | g | h | j | k | | |
| 2.2 | 1.5 | 1.1 | 8.6 | 1.8 | 6.2 | 10.0 | 7.7 | 1.8 | |
| z | x | c | v | b | n | m | | | |
| 0.3 | 2.4 | 2.8 | 8.5 | 0.9 | 4.5 | 3.2 | | | |
| 2.6 | 6.3 | 8.8 | 22.6 | 7.0 | 15.9 | 16.6 | 11.8 | 4.9 | 3.2 |

36.2
40.6
22.6

KEYSTROKE FREQUENCY (%)

FIG. 12

UPPERCASE CORRESPONDENCE TABLE

| CHARACTER KEY | CHARACTER STRING OF LOWERCASE CHARACTER KEY |
|---|---|
| A | qegg |
| B | qbh |
| C | qch |
| D | qdh |
| E | qee |
| F | qff |
| G | qgh |
| H | qhh |
| I | qii |
| J | qjj |
| K | qkh |
| L | qlg |
| M | qmg |
| N | qny |
| O | qsr |
| P | qph |
| Q | qg |
| R | qrr |
| S | quug |
| T | qth |
| U | quu |
| V | qvv |
| W | qww |
| X | qng |
| Y | qyy |
| Z | qzh |

FIG. 13

| | W | E | R | T | Y | U | I | O | P | |
|---|---|---|---|---|---|---|---|---|---|---|
| | 0.4 | 1.5 | 2.9 | 0.8 | 1.1 | 1.0 | 1.6 | 0.0 | 1.0 | |
| w | e | r | t | y | u | i | o | p | | |
| 0.2 | 2.0 | 1.9 | 2.9 | 3.7 | 2.0 | 2.5 | 1.2 | 3.1 | 3.3 | |
| A | S | D | F | G | H | J | K | L | | |
| 0.4 | 0.1 | 0.0 | 0.3 | 0.0 | 0.4 | 2.5 | 3.1 | 0.0 | | |
| a | s | d | f | g | h | j | k | l | | |
| 2.6 | 3.6 | 0.5 | 9.9 | 1.2 | 2.3 | 6.2 | 2.1 | | | |
| | X | C | V | B | N | M | | | | |
| | 0.0 | 0.4 | 1.1 | 0.5 | 0.2 | 2.2 | | | | |
| | x | c | v | b | n | m | | | | |
| | 0.1 | 3.8 | 2.8 | 0.2 | 4.2 | 3.8 | | | | |
| 3.3 | 10.3 | 7.8 | 23.0 | 6.4 | 11.5 | 17.7 | 10.3 | 5.2 | 4.3 | KEYSTROKE FREQUENCY (%) |

| 10.3 | 22.8 | 6.8 | 33.4 | 8.1 | 18.4 |
|---|---|---|---|---|---|

FIG. 14

| | W | E | R | T | Y | U | I | O | P | |
|---|---|---|---|---|---|---|---|---|---|---|
| | 0.3 | 1.8 | 2.4 | 0.7 | 1.5 | 0.9 | 2.0 | 0.0 | 0.6 | 10.2 |
| q | w | e | r | t | y | u | i | o | p | |
| 0.2 | 2.4 | 2.3 | 2.1 | 4.6 | 2.6 | 2.2 | 1.0 | 3.9 | 3.4 | 24.7 |
| A | S | D | F | G | H | J | K | L | | |
| 0.0 | 0.0 | 0.0 | 0.3 | 0.0 | 0.3 | 3.2 | 1.8 | 0.0 | | 5.6 |
| a | s | d | f | g | h | j | k | l | | |
| 2.8 | 1.8 | 1.3 | 9.9 | 0.9 | 1.8 | 6.0 | 7.6 | 2.2 | | 34.3 |
| Z | X | C | V | B | N | M | | | | |
| 0.0 | 0.4 | 1.0 | 2.6 | 1.0 | 0.9 | 0.9 | | | | 6.8 |
| z | x | c | v | b | n | m | | | | |
| 0.3 | 2.9 | 2.5 | 5.2 | 0.2 | 4.2 | 3.1 | | | | 18.4 |
| 3.3 | 7.8 | 8.9 | 22.5 | 7.4 | 11.3 | 16.3 | 12.4 | 6.1 | 4.0 | |

KEYSTROKE FREQUENCY (%)

LATIN CHARACTER CONVERSION APPARATUS, LATIN CHARACTER CONVERSION METHOD, AND NON-TRANSITORY COMPUTER-READABLE RECORDING MEDIUM ENCODED WITH LATIN CHARACTER CONVERSION PROGRAM

TECHNICAL FIELD

This invention relates to a Latin character conversion apparatus, a Latin character conversion method, and a non-transitory computer-readable recording medium encoded with a Latin character conversion program and, more specifically, to a Latin character conversion apparatus that converts a Latin character into another character that is different from the Latin character, a Latin character conversion method executed by the Latin character conversion apparatus, and a non-transitory computer-readable recording medium encoded with a Latin character conversion program that causes a computer to execute the Latin character conversion method.

BACKGROUND ART

Burmese (Myanmar) characters are a type of abugida characters and mainly used in Burmese notation. As for a method of inputting Burmese characters in a computer, an assembly arrangement based on letter shapes is widely used as a system diverted from an old-type typewriter.

Also, as an input method of inputting Burmese characters in a computer, JP 3088476 B2, for example, describes a Myanmar language input apparatus in which a reading of Myanmar language, which has a syllable constituted by four constituents: an initial consonant, a medial consonant, a vowel, and a tone, and has a first type medial consonant y being a palatalized medial consonant and a second type medial consonant w being a labialized medial consonant, is input by keying and then converted into a Myanmar character string. This Myanmar language input apparatus is characterized by including: a keyboard having a plurality of keys, at least a shift key, and a conversion key; reading code output means having input mode information that indicates whether a current input mode is a consonant input mode in which a consonant connection portion being a combination of the first type medial consonant y and the initial consonant, constituting the syllable of Myanmar language, is input, or a vowel input mode in which a vowel connection portion being a combination of the second type medial consonant w, the vowel, and the tone is input, for outputting a read code of the corresponding consonant connection portion or a read code of the vowel connection portion to a buffer, based on a key code input by keying of only one of the plurality of keys or simultaneous keying of one of the plurality of keys and the shift key and based on the input mode information, and also changing the input mode information to another input mode; and Myanmar character conversion means in response to input of the conversion key for converting a combination of the read code of the consonant connection portion and the read code of the vowel connection portion output to the buffer by the read code output means into a corresponding Myanmar character.

However, the Myanmar language input apparatus as described in JP 3088476 B2 has a problem in which since the consonant connection portion and the vowel connection portion are input respectively, the number of keys assigned with the consonant connection portion and vowel connection portion is increased, making it difficult to look for keys respectively assigned with the consonant connection portion and the vowel connection portion of a syllable to be input.

[Patent Document 1] JP 3088476 B2

SUMMARY OF INVENTION

Technical Problem

This invention is made to solve the aforementioned problem, and one object of this invention is to provide a Latin character conversion apparatus that facilitates an operation of converting a Latin character into a character code established by a character encoding scheme of the Unicode Standard.

Another object of this invention is to provide a Latin character conversion method that facilitates an operation of converting a Latin character into a character code established by a character encoding scheme of the Unicode Standard.

A further object of this invention is to provide a non-transitory computer-readable recording medium encoded with a Latin character conversion program that facilitates an operation of converting a Latin character into a character code established by a character encoding scheme of the Unicode Standard.

Solution to Problem

According to an aspect of this invention to achieve the aforementioned objects, the Latin character conversion apparatus includes code association means for associating each of a plurality of character keys assigned with Latin characters among a plurality of keys included in a keyboard with any of a plurality of character codes established by the character encoding scheme of the Unicode Standard with respect to characters different from the Latin characters, character association means for associating the character code to a relevant code being a different character code, code conversion means in response to an instruction by a user that instructs any of the plurality of character keys for determining the character code associated with the instructed character key by the code association means as a conversion candidate, and character conversion means in response to an instruction by the user that instructs the character key serving also as a conversion key of the plurality of character keys with the conversion candidate determined, for converting the conversion candidate into the relevant code associated with the conversion candidate by the code association means.

According to another aspect of this invention, a Latin character conversion method causes a Latin character conversion apparatus to execute a code conversion step of, in response to an instruction by a user that instructs any of a plurality of character keys assigned with Latin characters among a plurality of keys included in a keyboard, with use of a code association table that associates each of the plurality of character keys with any of a plurality of character codes established by a character encoding scheme of the Unicode Standard with respect to characters different from the Latin characters, determining the character code associated with the instructed character key by the code association table as a conversion candidate, and a character conversion step of, in response to acceptance of the character key serving also as a conversion key of the plurality of character keys with the conversion candidate determined, with use of a character association table that associates the character code with a relevant code being another character code, converting the conversion candidate into the relevant code associated with the conversion candidate by the code association table.

According to still another aspect of this invention, a non-transitory computer-readable recording medium encoded with a Latin character conversion program executed by a computer, the Latin character conversion program causing the computer to, in response to an instruction by a user that instructs any of a plurality of character keys assigned with Latin characters among a plurality of keys included in a keyboard, with use of a code association table that associates each of the plurality of character keys with any of a plurality of character codes established by a character encoding scheme of the Unicode Standard with respect to characters different from the Latin characters, determine the character code associated with the instructed character key by the code association table as a conversion candidate, and in response to acceptance of the character key serving also as a conversion key of the plurality of character keys with the conversion candidate determined, with use of a character association table that associates the character code with a relevant code being another character code, convert the conversion candidate into the relevant code associated with the conversion candidate by the code association table.

BRIEF DESCRIPTION OF THE DRAWINGS

FIG. 3 is a diagram showing one example of a code association table.

FIG. 4 is a diagram showing one example of a character association table.

FIG. 9 is a diagram showing a specific example of the Latin character conversion processing.

FIG. 10 is a diagram showing keystroke frequency with use of a literary corpus.

FIG. 11 is a diagram showing keystroke frequency with use of a colloquial corpus.

FIG. 12 is a diagram showing one example of an uppercase correspondence table.

FIG. 13 is a diagram showing keystroke frequency with use of the literary corpus in a case where the uppercase correspondence table is used.

FIG. 14 is a diagram showing keystroke frequency including uppercase with use of the colloquial corpus in a case where the uppercase correspondence table is used.

DESCRIPTION OF EMBODIMENTS

Figure 1:
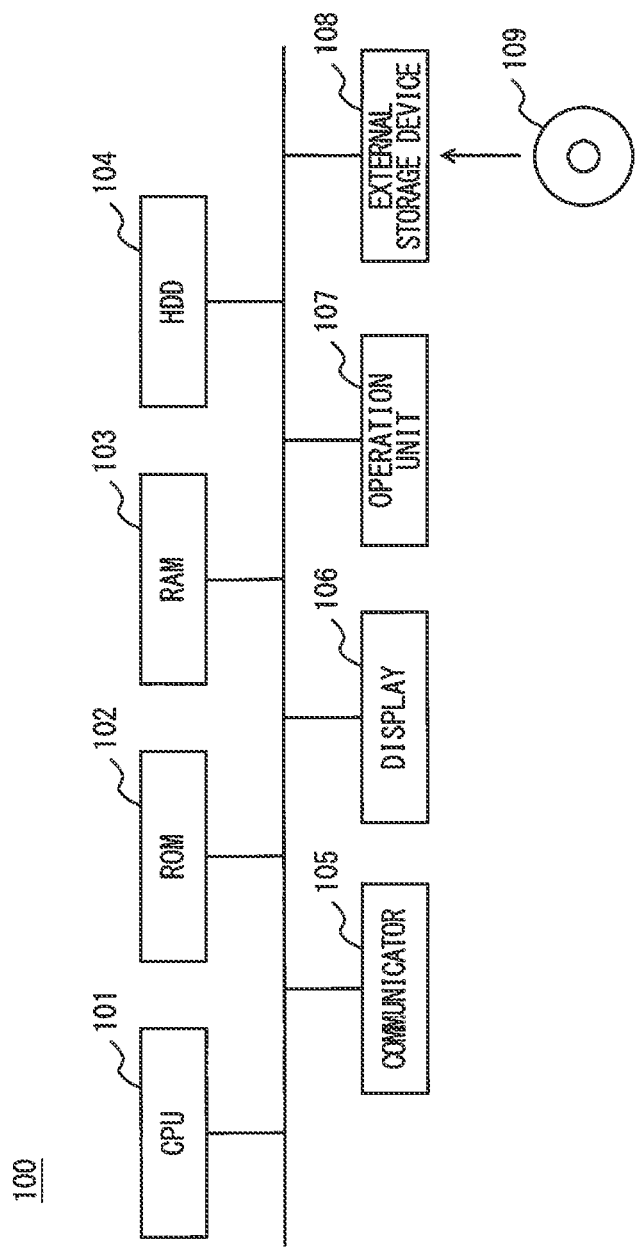
FIG. 1 is a diagram showing one example of a hardware configuration of a Latin character conversion apparatus in one of embodiments of the present invention.

Embodiments of the present invention will be described below with reference to the drawings. In the following description, the same parts are denoted with the same reference characters. Their names and functions are also the same. Thus, a detailed description thereof will not be repeated.

A Latin character conversion apparatus in this embodiment can be implemented by installing a Latin character conversion program in a general computer. While a personal computer (PC) is used as one example of a Latin character conversion apparatus 100 in this embodiment, the Latin character conversion apparatus 100 may be any apparatus that can install a program to be executed, for example, a portable information device such as a smartphone.

FIG. 1 is a diagram showing one example of a hardware configuration of a Latin character conversion apparatus in one of embodiments of the present invention. With reference to FIG. 1, the Latin character conversion apparatus 100 includes a central processing unit (CPU) 101 for controlling the entire Latin character conversion apparatus 100, a ROM (Read Only Memory) 102 that stores a program to be executed by the CPU 101, a RAM (Random Access Memory) 103 used as a work area of the CPU 101, a hard disc drive (HDD) 104 that stores data in a non-volatile manner, a communicator 105 that connects the CPU 101 to a network, a display 106 that displays information, an operation unit 107 that accepts an operation by a user, and an external storage device 108.

The display 106 is a liquid crystal display (LCD), for example, and displays an image. Alternatively, any device that displays an image, for example, an organic EL (electroluminescence) display may be used in place of the LCD.

The operation unit 107 includes a keyboard. The keyboard has a plurality of keys respectively assigned with a plurality of characters of Latin characters. The plurality of keys are arranged in a QWERTY arrangement. When any of the plurality of keys included in the keyboard is instructed by the user, the operation unit 107 outputs key identification information for identifying the key instructed by the user to the CPU 101. Also, the operation unit 107 may be a touch panel arranged to be superimposed on the display 106 in place of the keyboard. In this case, the CPU 101 displays an image of the keyboard on the display 106, and the touch panel detects a position instructed by the user in the image of the keyboard. The image of the keyboard is an image in which images of the plurality of keys respectively assigned with the plurality of characters of Latin characters are arranged in the QWERTY arrangement. The CPU 101 specifies a key arranged at the position instructed by the user in the image of the keyboard displayed on the display 106 and specifies key identification information for identifying the specified key.

The communicator 105 is connected to a network. The network includes a local area network and the Internet. Thus, the CPU 101 can communicate with another computer via the network.

A CD-ROM 109 is attached to the external storage device 108. The CPU 101 can access the CD-ROM 109 via the external storage device 108. The CPU 101 loads a program recorded in the CD-ROM 109 attached to the external storage device 108 into the RAM 103 for execution. A medium that stores the program to be executed by the CPU 101 is not limited to the CD-ROM 109, but may be a semiconductor memory such as an optical disc, an IC card, an optical card, a mask ROM, or an EPROM.

Also, the program to be executed by the CPU 101 is not limited to the program recorded in the CD-ROM 109, but a program stored in the HDD 104 may be loaded into the RAM 103 for execution. In this case, another computer connected to the Internet may overwrite the program stored in the HDD 104 of the Latin character conversion apparatus 100 or may additionally write a new program. Furthermore, the Latin character conversion apparatus 100 may download the program from another computer connected to the Internet and store the program in the HDD 104. The program referred to here includes not only a program directly executable by the CPU 201 but also a source program, a compressed program, an encrypted program or the like.

A medium that stores the program to be executed by the CPU 101 is not limited to the CD-ROM 109, but may be a semiconductor memory such as an optical disc (MO (Magnetic Optical Disc)/MD (Mini disc)/DVD (Digital Versatile Disc)), an IC card, an optical card, a mask ROM, an EPROM (Erasable Programmable ROM), or an EEPROM (Electrically EPROM).

Figure 2:
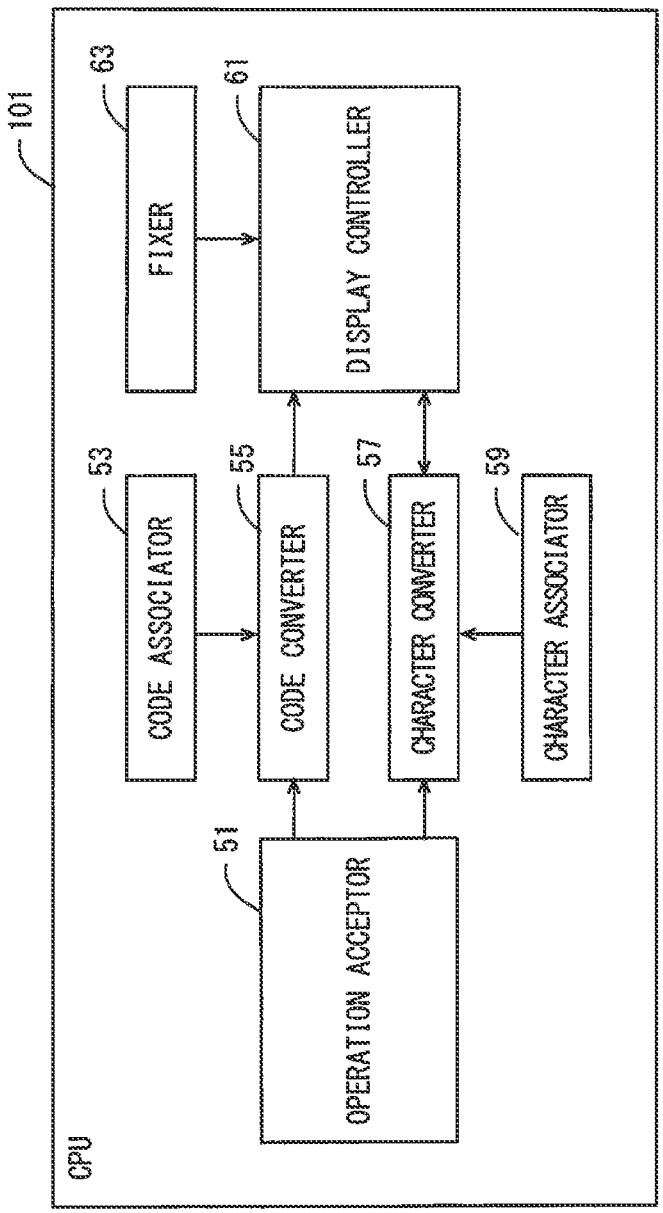
FIG. 2 is a block diagram showing one example of a function of a CPU included in the Latin character conversion apparatus.

FIG. 2 is a block diagram showing one example of a function of the CPU included in the Latin character conversion apparatus. The function shown in FIG. 2 is a function formed in the CPU 101 included in the Latin character conversion apparatus 100 by the CPU 101 executing a Latin character conversion program stored in the ROM 102, the HDD 104, and the CD-ROM 109. With reference to FIG. 2, the CPU 101 includes an operation acceptor 51, a code associator 53, a code converter 55, a character converter 57, a character associator 59, a display controller 61, and a fixer 63.

The operation acceptor 51 accepts an operation input by the user. Specifically, the operation acceptor 51 accepts the key identification information output by the operation unit 107 as an operation in which the user instructs any of the plurality of keys included in the keyboard of the operation unit 107.

The code associator 53 associates each of the plurality of character keys of the plurality of keys included in the keyboard with any of a plurality of character codes established by a character encoding scheme of the Unicode Standard. The character keys are keys each assigned with any of the plurality of characters of Latin characters. Thus, the key identification information of the character key is associated with one character of Latin characters.

The code associator 53 stores a code association table into the HDD 104. The code association table associates a character code for each of the plurality of character keys. Specifically, the code association table associates the key identification information with the character codes. Here, the key identification information of a character key is a Latin character assigned to the character key. The character code assigned to the character key is a character code assigned to a character different from the Latin character. In this embodiment, the character code of the character different from the Latin character is a character code of any of Burmese characters. Thus, the code association table associates a character of Latin characters assigned to a character key with the character code of a Burmese character assigned to the character key for each of the plurality of character keys.

The character associator 59 associates a character code with a relevant code. The character code and the relevant code are any of the plurality of character codes established by the character encoding scheme of the Unicode Standard. The relevant code is another character code different from the character code. The character associator 59 stores a character association table into the HDD 104. The character association table associates a character code with a relevant code associated with the character code for each of the plurality of character codes.

In a case where a character key is specified by the key identification information accepted by the operation acceptor 51, the code converter 55 determines a character code associated with the character key by the code association table as a conversion candidate. The code converter 55 stores the character code determined as the conversion candidate in a buffer. The buffer is a predetermined memory region of the RAM 103.

In a case where the character key is specified by the key identification information accepted by the operation acceptor 51, the character converter 57 converts the character code of the conversion candidate into the relevant code that is associated with the character code of the conversion candidate by the character association table on condition that the specified character key is a predetermined conversion key. The conversion key is defined by the character code of the conversion candidate stored in the buffer. The character converter 57 overwrites the character code of the conversion candidate stored in the buffer with the relevant code associated with the character code of the conversion candidate by the character association table.

The fixer 63 sets the character code of the conversion candidate in a fixed state in a case where the character code of the conversion candidate stored in the buffer satisfies predetermined conditions. The fixed state is a state that cannot be converted by the character converter 57, and the character code is no longer the conversion candidate. The fixer 63 outputs a fixing instruction to the display controller 61 in a case where the fixer 63 sets the character code of the conversion candidate in the fixed state. The fixing instruction includes the character code set in the fixed state.

The predetermined conditions include a first condition that the character key specified by the key identification information accepted by the operation acceptor 51 is a predetermined fixing key, a second condition that the character key specified by the key identification information accepted by the operation acceptor 51 is not a conversion key, and a third condition that the relevant code associated with the conversion candidate by the code association table is not present.

In a case where the character key is specified by the key identification information accepted by the operation acceptor 51 and in a case where the conversion candidate is not set in the fixed state, the character converter 57 converts the conversion candidate into the relevant code. In the case where the character key is specified by the key identification information accepted by the operation acceptor 51 and in a case where the conversion candidate is set in the fixed state, the character converter 57 does not convert the conversion candidate into the relevant code, but the code converter 55 determines a new conversion candidate and, therefore, the new conversion candidate is stored in the buffer.

The display controller 61 displays on the display 106 images of characters established by the character encoding scheme of the Unicode Standard with respect to one or more character codes stored in the buffer. The buffer stores the one or more character codes. There are a case where the one or more character codes include one character code of the conversion candidate, a case where the one or more character codes include one or more character codes in the fixed state, and a case where the one or more character codes include one character code of the conversion candidate following the one or more character codes in the fixed state. The display controller 61 displays a display mode of images of one or more characters respectively corresponding to the one or more character codes in a different manner between the case with the fixed state and the case with the conversion candidate. The display mode is directed to, for example, thickness of lines, luminosity, and presence or absence of modifying characters. The modifying characters are, for example, underlines or hatching. For instance, the image of the character corresponding to the character code in the fixed state is displayed in bold character, while the image of the character corresponding to the character code of the conversion candidate is displayed by thin lines.

FIG. 3 is a diagram showing one example of the code association table. With reference to FIG. 3, the code association table includes a code conversion record for each of the plurality of character keys. The code conversion record includes an item of character keys and an item of character codes and associates the character keys with the character codes. Key identification information for identifying the character keys is set in the item of character keys. In this embodiment, the key identification information is Latin characters assigned to the respective character keys. The character codes are set in the item of character codes. The character codes are any of the plurality of character codes established by the character encoding scheme of the Unicode Standard. The character codes are shown in hexadecimal notation.

As for the characters other than Latin characters a, o, x, q, one character code is associated with one Latin character. A combination of two character codes is associated with each of the Latin characters a, o, x. Nothing is associated with the Latin character q. A character key assigned with the Latin character q is used as the fixing key. For example, a character key assigned with a Latin character "b" is assigned with a character code "1017." As such, in a case where the character key assigned with the Latin character "b" is instructed by the user, the character of the character code "1017" is determined as the conversion candidate and is displayed on the display 106.

FIG. 4 is a diagram showing one example of the character association table. The character association table associates character codes with relevant codes for each of a plurality of conversion keys. Specifically, the character association table includes a plurality of character conversion records. The character conversion records include an item of conversion keys, an item of character codes, and an item of relevant codes. Key identification information assigned to the character keys defined as the conversion keys is set in the item of conversion keys. The key identification information is Latin characters. Character codes before conversion are set in the item of character codes. Character codes of relevant codes associated with the character codes before conversion are set in the item of relevant codes.

In this embodiment, the conversion keys are character keys assigned with Latin characters e, f, g, h, i, j, r, u, v, w, y, a, respectively. For example, a relevant code 100F is associated with a set of the character key assigned with the Latin character g and a character code 1004. Thus, in a case where the character key assigned with the Latin character g is instructed by the user, if the character code 1004 of the conversion candidate is stored in the buffer, the character code 1004 is overwritten with the character code 100F being the relevant code. In this case, a display of a character of the character code 1004 is switched to a display of a character of the character code 100F.

Figure 5:
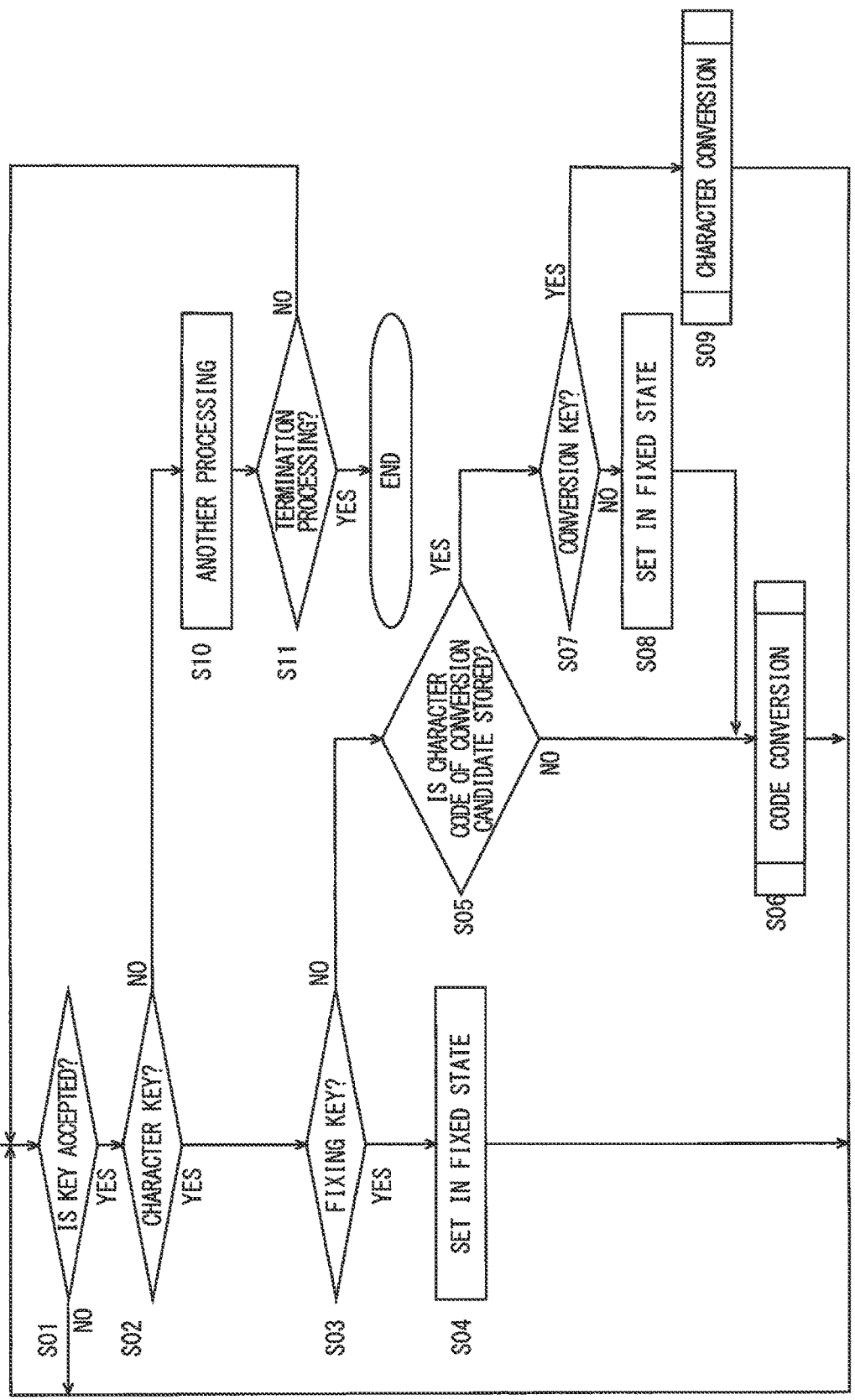
FIG. 5 is a flowchart showing one example of a flow of Latin character conversion processing.

FIG. 5 is a flowchart showing one example of a flow of Latin character conversion processing. The Latin character conversion processing is processing executed by the CPU 101, included in the Latin character conversion apparatus 100, executing the Latin character conversion program stored in the ROM 102, the HDD 104, and the CD-ROM 109. With reference to FIG. 5, the CPU 101 determines whether a key instructed by the user is accepted (step S01). In a case where the user instructs any of the plurality of keys included in the keyboard of the operation unit 107, the keyboard outputs key identification information. Therefore, in a case where the key identification information output by the keyboard is accepted, the key instructed by the user is accepted. The CPU 101 is set in a standby state until the key is accepted (NO in step S01). If the key is accepted (YES in step S01), the processing proceeds to step S02.

In step S02, it is determined whether the accepted key is a character key. The character key is a key assigned with any of the plurality of characters of Latin characters. If the character key is accepted, the processing proceeds to step S03. If not, the processing proceeds to step S10. In step S10, the CPU 101 executes processing assigned to the accepted key, and then the processing proceeds to step S11. In step S11, it is determined whether the processing assigned to the accepted key is processing to terminate the program. If the assigned processing is the processing to terminate the program, the processing is terminated. If not, the processing returns to step S01.

In step S03, it is determined whether the character key is a fixing key. The fixing key is a character key assigned with a predetermined one of the plurality of characters of Latin characters. In this embodiment, the fixing key is the character key assigned with the Latin character q. If the character key is the fixing key, the processing proceeds to step S04. It not, the processing proceeds to step S05. In step S05, it is determined whether the character code of the conversion candidate is stored in the buffer. If the character code of the conversion candidate is stored in the buffer, the processing proceeds to step S07. If not, the processing proceeds to step S06. In a case where nothing is stored in the buffer, or in a case where all of the one or more character codes stored in the buffer are set in the fixed state, the processing proceeds to step S06.

In step S06, code conversion processing is executed, and the processing returns to step S01. While the code conversion processing will be described in detail below, the code conversion processing is processing of determining a character code associated with the Latin character assigned to the character key accepted in step S01.

In a case where the character key instructed by the user is determined as the fixing key in step S03, the processing proceeds to step S04. In step S04, the character code stored in the buffer is set in the fixed state, and the processing returns to step S01.

A case where the processing proceeds to step S07 refers to a case where the character key instructed by the user is not the fixing key and a case where the character code of the conversion candidate is stored in the buffer. In step S07, it is determined whether the character key serves also as a conversion key. The conversion key is a character key assigned with a predetermined character of the plurality of characters of Latin characters. The conversion key is a character key assigned with any of e, f, g, h, i, j, r, u, v, w, y, and a. The conversion key is defined by the character code stored as the conversion candidate in the buffer. Specifically, it is defined whether the character key instructed by the user corresponds to the conversion key based on the character code stored in the buffer. More specifically, the character key may be the conversion key in a case where the relevant code is associated with a combination of the character code of the conversion candidate stored in the buffer and the key identification information of the character key instructed by the user. More specifically, if a character conversion record, in which the key identification information of the character key instructed by the user is set in the item of character keys, and the character code stored in the buffer is set in the item of character codes, is present in the character association table, then the character key instructed by the user is determined as the conversion key. If such a character conversion record is not present in the character association table, the character key instructed by the user is not determined as the conversion key. If the character key instructed by the user is the conversion key, a character conversion record, in which the key identification information of the character key instructed by the user is set in the item of character keys, and the character code of the conversion candidate stored in the buffer is set in the item of character codes, is set to a process target, and the processing proceeds to step S09. If not, the processing proceeds to step S08. In step S09, character conversion processing is executed, and the processing returns to step S01. While the character conversion processing will be described in detail below, the character conversion processing is processing of converting the character code stored in the buffer into the relevant code.

In step S08, the character code of the conversion candidate stored in the buffer is set in the fixed state, and the processing proceeds to step S06. In a case where the character code of the conversion candidate is stored in the buffer and in a case where the character key instructed by the user cannot be the conversion key, the processing in step S06 is executed in order to process the character key instructed by the user as the character key rather than the conversion key. Also, since the character code stored in the buffer is set in the fixed state at a stage before the code conversion processing is executed in step S06, an image of the character of the character code stored in the buffer is fixedly displayed on the display 106.

A case where the code conversion processing is executed refers to a case where no character code is stored in the buffer, or a case where the character code stored in the buffer is set in the fixed state, or a case where the character code of the conversion candidate is stored in the buffer and the character key instructed by the user cannot be the conversion key.

Figure 6:
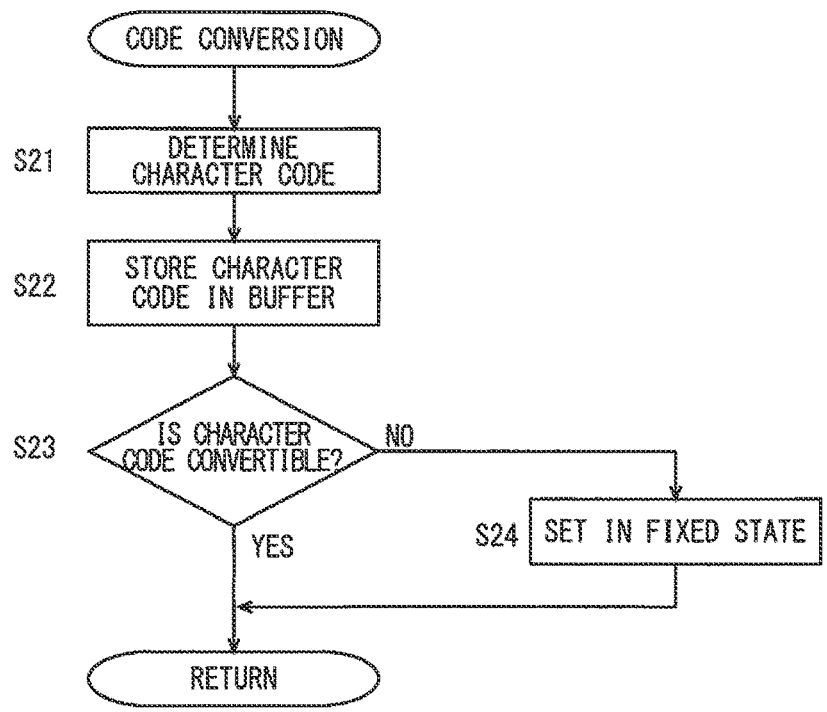
FIG. 6 is a flowchart showing one example of a flow of code conversion processing.

FIG. 6 is a flowchart showing one example of a flow of the code conversion processing. The code conversion processing is processing executed in step S06 of the Latin character conversion processing. The character key instructed by the user is determined at the stage before the code conversion processing is executed. With reference to FIG. 6, the CPU 101 determines the character code as a process target in step S21 and proceeds with the processing to step S22. Specifically, by reference to the code association table, the CPU 101 determines the character code associated with the Latin character being the key identification information of the character key instructed by the user as the process target.

In step S22, the character code determined as the process target is stored in the buffer, and the processing proceeds to step S23. In step S23, it is determined whether the character code stored in the buffer is convertible into the relevant code. Specifically, if a character conversion record in which the character code stored in the buffer is set in the item of character codes is present in the character association table, it is determined that that character code is converted into the relevant code. If such a character conversion record is not present in the character association table, it is determined that that character code is inconvertible into the relevant code. If the character code stored in the buffer is convertible into the relevant code, the processing returns to the Latin character conversion processing. If not, the processing proceeds to step S24. In step S24, the character code stored in the buffer is set in the fixed state, and the processing returns to the Latin character conversion processing.

Figure 7:
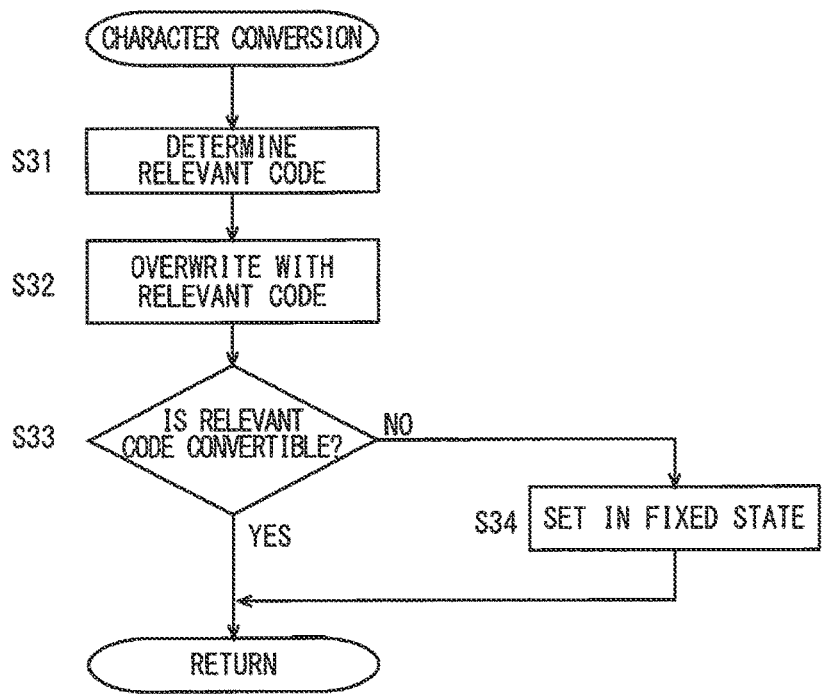
FIG. 7 is a flowchart showing one example of a flow of character conversion processing.

FIG. 7 is a flowchart showing one example of a flow of the character conversion processing. The character conversion processing is processing executed in step S09 of the Latin character conversion processing. The character conversion record is specified as a process target at the stage before the character conversion processing is executed. By reference to FIG. 7, the CPU 101 determines the relevant code as the process target in step S31 and proceeds with the processing to step S32. Specifically, the CPU 101 determines that the character code set in the item of relevant codes in the character conversion record specified as the process target is a process target as the relevant code.

In step S32, the character code of the conversion candidate stored in the buffer is overwritten with the relevant code determined as the process target, and the processing proceeds to step S33. In step S33, it is determined whether the relevant code determined as the process target is set to be convertible into another character code. Specifically, if a character conversion record in which a character code that is the same as the relevant code determined as the process target is set is present in the character association table, the CPU 101 determines that the relevant code is set to be convertible into another character code. If such a character conversion record is not present in the character association table, the CPU 101 determines that the relevant code is not set to be convertible into another character code. If the relevant code as the process target is set to be convertible into another character code, the processing returns to the Latin character conversion processing. If not, the processing proceeds to step S34.

In step S34, the character code stored in the buffer is set in the fixed state, and the processing returns to the Latin character conversion processing. Since the character code of the conversion candidate stored in the buffer is not converted, if such a character code is set in the fixed state, then an image of the character of the character code stored in the buffer is fixedly displayed on the display 106.

Figure 8:
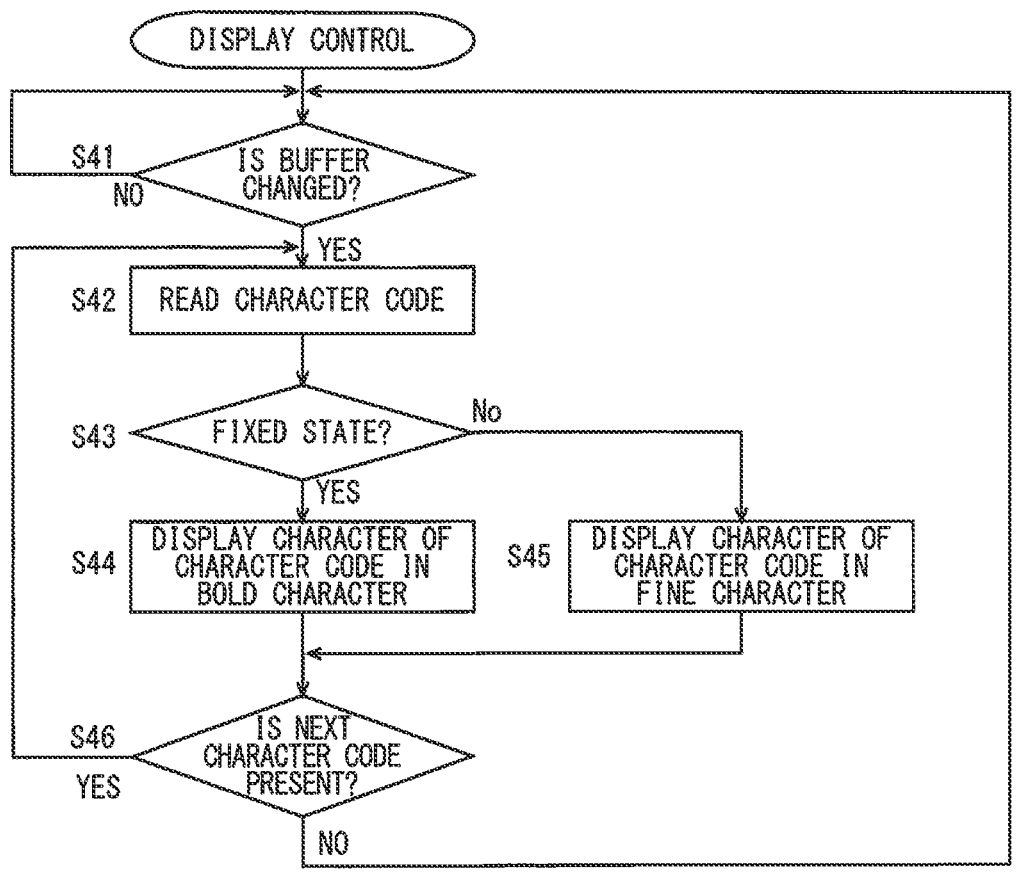
FIG. 8 is a flowchart showing one example of a flow of display control processing.

FIG. 8 is a flowchart showing one example of a flow of display control processing. The display control processing is processing executed by the CPU 101 included in the Latin character conversion apparatus 100, executing a display control program stored in the ROM 102, the HDD 104, and the CD-ROM 109. The display control program is part of the Latin character conversion program.

With reference to FIG. 8, the CPU 101 determines whether the character code stored in the buffer is changed. In a case where a character code is newly added to the buffer or in a case where the character code of the conversion candidate stored in the buffer is changed to the relevant code, the CPU 101 determines that the character code stored in the buffer is changed. The CPU 101 is in the standby state until the character code stored in the buffer is changed (NO in step S41), and if the character code stored in the buffer is changed, then the CPU 101 proceeds with the processing to step S42. In step S42, the one or more character codes stored in the buffer are read in order, and the processing proceeds to step S43. In step S43, it is determined whether the read character code is set in the fixed state. If the read character code is set in the fixed state, the processing proceeds to step S44. If not, the processing proceeds to step S45. In step S44, the character of the character code is displayed in bold character, and the processing proceeds to step S46. In step S45, the character of the character code is displayed in fine character, and the processing proceeds to step S46. In step S46, it is determined whether any character code of the one or more character codes stored in the buffer, which is not read in step S42 is present. If the character code, which is not read yet is present, the processing returns to step S42. If not, the processing returns to step S41.

<Inventive Example>

FIG. 9 is a diagram showing a specific example of the Latin character conversion processing. In FIG. 9, character codes stored in the buffer and characters displayed on the display 106 are indicated every time each of the plurality of character keys is instructed in order by the user. Some of the character codes stored in the buffer are conversion candidates and the others are in the fixed state. The character codes of the conversion candidates are represented by reversed characters, and the character codes in the fixed state are underlined. As for images of the characters displayed on the display, the images of the characters of the character codes in the fixed state are represented by thick lines, and the images of the characters of the character codes of the conversion candidates are represented by thin lines.

First, in a case where a character key assigned with a Latin character k is instructed by the user, a character code 1000 associated with the Latin character k is stored in the buffer, and a character of the character code 1000 is displayed on the display 106. At this stage, since the character code 1000 is convertible into a character code 1001, the character code 1000 is set to a conversion candidate, and the character of the character code 1000 is displayed by thin lines on the display 106.

Second, in a case where a character key assigned with a Latin character n is instructed by the user, the character key assigned with the Latin character n is not a conversion key. As such, the character code 1000 of the conversion candidate stored in the buffer is set in the fixed state, and the character of the character code 1000 is displayed by thick lines on the display 106. Also, since a character code 1014 associated with the Latin character n in the buffer is convertible into a character code 1004, the character code 1014 is newly stored as a conversion candidate in the buffer, and a character of the character code 1014 of the conversion candidate is displayed by thin lines on the display 106. Specifically, the character of the character code 1000 displayed by thin lines on the display 106 is displayed by thick lines, and the character of the character code 1014 is displayed on the right side of the character of the character code 1000.

Third, in a case where a character key assigned with a Latin character g is instructed by the user, since the character code 1014 of the conversion candidate is stored in the buffer, the character key is the conversion key. As such, the character code 1014 of the conversion candidate stored in the buffer is overwritten with the character code 1004 associated with a set of the character code 1014 and the Latin character g. Also, since the character code 1004 is convertible into a character code 100F, the character code 1004 is stored as the conversion candidate in the buffer. The character of the character code 1014 displayed by thin lines on the display 106 is changed to a thin-lined character of the character code 1004.

Fourth, in a case where a character key assigned with the Latin character g is instructed by the user, since the character code 1004 of the conversion candidate is stored in the buffer, the character key is the conversion key. As such, the character code 1004 of the conversion candidate stored in the buffer is overwritten with the character code 100F associated with a set of the character code 1004 and the Latin character g. Also, since the character code 100F is convertible into a character code 104C, the character code 100F is stored as a conversion candidate in the buffer. The character of the character code 1004 displayed by thin lines on the display 106 is changed to a thin-lined character of the character code 100F for display.

Fifth, in a case where a character key assigned with a Latin character f is instructed by the user, since neither a character code 1039 nor a character code 103A is stored in the buffer, the character key is not the conversion key. As such, the character code 100F of the conversion candidate stored in the buffer is set in the fixed state, and the character code 100F is displayed by thick lines on the display 106. Also, since the character code 103A associated with the Latin character f is convertible into the character code 1039, the character code 103A is newly stored as the conversion candidate in the buffer, and a character of the character code 103A of the conversion candidate is displayed by thin lines on the display 106. Specifically, the character of the character code 100F displayed by thin lines on the display 106 is displayed by thick lines, and the character of the character code 103A is displayed by thin lines above the character of the character code 100F.

Sixth, in a case where the character key assigned with the Latin character f is instructed by the user, since the character code 103A of the conversion candidate is stored in the buffer, the character key is the conversion key. As such, the character code 103A of the conversion candidate stored in the buffer is overwritten with the character code 1039 associated with a set of the character code 103A and the Latin character f. Also, since the character code 1039 is convertible into the character code 103A, the character code 1039 is stored as a conversion candidate in the buffer. The character of the character code 103A displayed by thin lines on the display 106 is changed to a thin-lined character of the character code 1039 for display.

Seventh, in a case where a character key assigned with a Latin character t is instructed by the user, the character key assigned with the Latin character t is not the conversion key. As such, the character code 1039 of the conversion candidate stored in the buffer is set in the fixed state. Also, since a character code 1010 associated with the Latin character t is convertible into a character code 101B or 1011, the character code 1010 is newly stored in the buffer as the conversion candidate, and a character of the character code 1010 of the conversion candidate is displayed by thin lines on the display 106. Specifically, the character of the character code 1039 temporarily displayed on the display 106 is fixed, and the character of the character code 1010 is displayed by thick lines at the same position as that of the character of the character code 1039. Since the character code 1039 is assigned with a character indicating that the character is displayed below, the character of the character code 1039 is replaced by the character of the character code 1010.

Eighth, in a case where a character key assigned with a Latin character h is instructed by the user, since the character code 1010 is stored in the buffer, the character key is the conversion key. As such, the character code 1010 of the conversion candidate stored in the buffer is overwritten with the character code 1011 associated with a set of the character code 1010 and the Latin character h. Also, since the character code 1011 is convertible into a character code 100C, the character code 1011 is stored as the conversion candidate in the buffer. The character of the character code 1010 displayed by thin lines on the display 106 is changed to a thin-lined character of the character code 1011 for display.

Ninth, in a case where a character key assigned with the Latin character g is instructed by the user, since the character code 1011 is stored in the buffer, the character key is the conversion key. As such, the character code 1011 of the conversion candidate stored in the buffer is overwritten with the character code 100C associated with a set of the character code 1011 and the Latin character g. Also, since the character code 100C is not convertible into another character code, the character code 100C is set in the fixed state. As such, the character of the character code 1011 displayed by thin lines on the display 106 is changed to a thick-lined character of the character code 100C for display.

Next, one example is shown in which keystroke frequency of the keyboard in the Latin character conversion apparatus 100 of this embodiment is calculated.

FIG. 10 is a diagram showing keystroke frequency with use of a literary corpus. The keystroke frequency shown in FIG. 10 represents the keystroke frequency in a case where Burmese data included in Asian Language Treebank (ALT) of literary language is used as the literary corpus. ALT data is constituted by 20,000 sentences of newspaper articles. With reference to FIG. 10, the frequencies of hitting central keys on the keyboard are higher than the frequencies of hitting surrounding keys. Thus, the keys with the higher keystroke frequencies are gathered in the central portion of the keyboard, thereby facilitating the user's operation of inputting a plurality of Latin characters to convert these Latin characters into sentences of literary Burmese language.

FIG. 11 is a diagram showing keystroke frequency with use of a colloquial corpus. The keystroke frequency shown in FIG. 11 represents the keystroke frequency in a case where Basic Travel Expression Corpus (BTEC) data of colloquial language is used as the colloquial corpus. The BTEC data is constituted by 400,000 sentences of travel dialogues. With reference of FIG. 11, the frequencies of hitting central keys on the keyboard are higher than the frequencies of hitting surrounding keys. Thus, the keys with the higher keystroke frequencies are gathered in the central portion of the keyboard, thereby facilitating the user's operation of inputting a plurality of Latin characters to convert these Latin characters into sentences of colloquial Burmese language.

<First Modification>

While only lowercase characters of Latin characters are used in the above-described embodiment, uppercase characters may be used in addition to the Latin lowercase characters.

FIG. 12 is a diagram showing one example of an uppercase correspondence table. With reference to FIG. 12, the uppercase correspondence table includes an uppercase correspondence record for each of the uppercase characters of Latin characters. The uppercase correspondence record includes an item for uppercase character keys and an item for character strings of lowercase character keys. The item for uppercase character keys represents the uppercase characters of Latin characters. The item for character strings of lowercase character keys represents character strings each constituted by two or more lowercase characters of Latin characters corresponding to an uppercase character. For example, a lowercase character string qegg is associated with a Latin uppercase character A. As such, an operation of instructing the uppercase character A is the same as an operation of firstly instructing a lowercase character q, secondly instructing a lowercase character e, thirdly instructing a lowercase character g, and fourthly instructing the lowercase character g.

An operation of instructing a Latin uppercase character is an operation of simultaneously instructing a key assigned with a lowercase character and a shift key. The number of keystrokes can be reduced by associating one uppercase character with a lowercase character string, thereby making it possible to further facilitate the user's operation as compared to a case where only lowercase characters are used.

FIG. 13 is a diagram showing frequency of keystrokes with use of the literary corpus when the uppercase correspondence table is used. With reference to FIG. 13, similarly to that shown in FIG. 10, the frequencies of hitting central keys on the keyboard are higher than the frequencies of hitting surrounding keys. Thus, the keys with the higher keystroke frequencies are gathered in the central portion of the keyboard, thereby further facilitating the user's operation of inputting a plurality of Latin characters to convert these Latin characters into sentences of literary Burmese language.

FIG. 14 is a diagram showing keystroke frequency including uppercase characters with use of the colloquial corpus when the uppercase correspondence table is used. With reference to FIG. 14, similarly to that shown in FIG. 11, the frequencies of hitting central keys on the keyboard are higher than the frequencies of hitting surrounding keys. Thus, the keys with the higher keystroke frequencies are gathered in the central portion of the keyboard, thereby further facilitating the user's operation of inputting a plurality of Latin characters to convert these Latin characters into sentences of colloquial Burmese language.

<Second Modification>

A conversion table combining the code association table and the character association table may be used.

Table 1 is a diagram showing one example of the conversion table. The conversion table associates Latin lowercase character strings with character codes. Each character string is an arrangement of one or more characters and includes one character.

For example, a character code 1000 is associated with a character string k of one character, a character code 1001 is associated with a character string kh of two characters, and a character code 1009 is associated with a character string nyg of three characters.

The Latin character conversion apparatus 100 of the second modification determines a character or a character string instructed by the user as any of the plurality of character codes with use of the conversion table shown in Table 1.

TABLE 1

Conversion Table

| Character String | Character Code | Character String | Character Code |
| --- | --- | --- | --- |
| k | 1000 | l g | 1020 |
| k h | 1001 | v v | 1021 |
| g | 1002 | i g | 1023 |
| g h | 1003 | i i g | 1024 |
| n g | 1004 | u g | 1025 |
| c | 1005 | u u g | 1026 |
| c h | 1006 | e g | 1027 |
| z | 1007 | s r | 1029 |
| z h | 1008 | s r g | 102A |
| n y g | 1009 | v g | 102B |
| n y | 100A | v | 102C |
| t g | 100B | i | 102D |
| t h g | 100C | i i | 102E |
| d g | 100D | u | 102F |
| d h g | 100E | u u | 1030 |
| n g g | 100F | e | 1031 |

TABLE 1-continued

Conversion Table

| Character String | Character Code | Character String | Character Code |
|---|---|---|---|
| t | 1010 | e e | 1032 |
| t h | 1011 | m g | 1036 |
| d | 1012 | j j | 1037 |
| d h | 1013 | j | 1038 |
| n | 1014 | f f | 1039 |
| p | 1015 | f | 103A |
| p h | 1016 | y | 103B |
| b | 1017 | r | 103C |
| b h | 1018 | w | 103D |
| m | 1019 | h | 103E |
| y y | 101A | s g | 103F |
| r r | 101B | n g g g | 104C |
| l | 101C | r r g | 104D |
| w w | 101D | l g g | 104E |
| s | 101E | e g g | 104F |
| h h | 101F | o | 102D, 102F |
|  |  | a | 1031, 102C |
|  |  | x | 1004, 103A |

Moreover, a conversion table that is a combination of the conversion table shown in Table 1 and the uppercase correspondence table shown in FIG. 12 may be used.

The disclosed embodiments are all made for purpose of illustration and example only and not limitation. The scope of the present invention is intended to be indicated by claims not the above description and to include all modifications within the meaning and the scope equivalent to the scope of claims.

The invention claimed is:

1. A Latin character conversion apparatus comprising:
code association means for associating each of a plurality of character keys assigned with Latin characters among a plurality of keys included in a keyboard with any of a plurality of character codes established by a character encoding scheme of Unicode Standard with respect to characters different from the Latin characters;
character association means for associating the character code with a relevant code being another one of the character codes;
code conversion means in response to an instruction by a user that instructs any of the plurality of character keys for determining the character code associated with the instructed character key by the code association means as a conversion candidate; and
character conversion means in response to an instruction by the user that instructs the character key serving also as a conversion key of the plurality of character keys with the conversion candidate determined, for converting the conversion candidate into the relevant code associated with the conversion candidate by the code association means.

2. The Latin character conversion apparatus according to claim 1, wherein the character conversion means determines the conversion key based on the conversion candidate with the conversion candidate determined.

3. The Latin character conversion apparatus according to claim 1, further comprising fixing means for setting the conversion candidate in a fixed state in which the conversion by the character conversion means is impossible.

4. The Latin character conversion apparatus according to claim 3, wherein the fixing means sets the conversion candidate in the fixed state in response to an instruction by the user that instructs the character key serving also as a fixing key of the plurality of character keys.

5. A Latin character conversion method for causing a Latin character conversion apparatus to execute:
a code conversion step of, in response to an instruction by a user that instructs any of a plurality of character keys assigned with Latin characters among a plurality of keys included in a keyboard, with use of a code association table that associates each of the plurality of character keys with any of a plurality of character codes established by a character encoding scheme of Unicode Standard with respect to characters different from the Latin characters, determining the character code associated with the instructed character key by the code association table as a conversion candidate; and
a character conversion step of, in response to acceptance of the character key serving also as a conversion key of the plurality of character keys with the conversion candidate determined, with use of a character association table that associates the character code with a relevant code being another one of the character codes, converting the conversion candidate into the relevant code associated with the conversion candidate by the code association table.

6. The Latin character conversion method according to claim 5, wherein the character conversion step includes a step of determining the conversion key based on the conversion candidate with the conversion candidate determined.

7. The Latin character conversion method according to claim 5, further comprising a fixing step of setting the conversion candidate in a fixed state where the conversion in the character conversion step is impossible.

8. The Latin character conversion method according to claim 7, wherein the fixing step includes a step of setting the conversion candidate in the fixed state in response to an instruction by the user that instructs the character key serving also as a fixing key of the plurality of character keys.

9. A non-transitory computer-readable recording medium encoded with a Latin character conversion program executed by a computer,
the Latin character conversion program causing the computer to:
in response to an instruction by a user that instructs any of a plurality of character keys assigned with Latin characters among a plurality of keys included in a keyboard, with use of a code association table that associates each of the plurality of character keys with any of a plurality of character codes established by a character encoding scheme of Unicode Standard with respect to characters different from the Latin characters, determine the character code associated with the instructed character key by the code association table as a conversion candidate; and
in response to acceptance of the character key serving also as a conversion key of the plurality of character keys with the conversion candidate determined, with use of a character association table that associates the character code with a relevant code being another one of the character codes, convert the conversion candidate into the relevant code associated with the conversion candidate by the code association table.

10. The non-transitory computer-readable recording medium according to claim 9, wherein the converting the conversion candidate includes determining the conversion key based on the conversion candidate with the conversion candidate determined.

11. The non-transitory computer-readable recording medium according to claim 9, wherein the Latin character conversion program causes the computer to further set the conversion candidate in the fixed state where the character conversion is impossible.

12. The non-transitory computer-readable recording medium according to claim 11, wherein the setting includes setting the conversion candidate in the fixed state in response to an instruction by the user that instructs the character key serving also as a fixing key of the plurality of character keys.

* * * * *